(12) United States Patent
Kishida et al.

(10) Patent No.: US 7,345,974 B2
(45) Date of Patent: Mar. 18, 2008

(54) OPTICAL RECORDING/REPRODUCING APPARATUS

(75) Inventors: Takanori Kishida, Ogaki (JP);
Tsuyoshi Yamamoto, Ota (JP);
Katsumi Hattori, Kiryu (JP); Masato Fuma, Ichinomiya (JP); Hiroshi Watanabe, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 533 days.

(21) Appl. No.: 10/975,074

(22) Filed: Oct. 28, 2004

(65) Prior Publication Data

US 2005/0094519 A1    May 5, 2005

(30) Foreign Application Priority Data

Nov. 4, 2003    (JP) ............................. 2003-373976

(51) Int. Cl.
*G11B 7/00*    (2006.01)
(52) U.S. Cl. ................. 369/53.2; 369/53.24; 369/47.53
(58) Field of Classification Search ..................... None
See application file for complete search history.

(56) References Cited

U.S. PATENT DOCUMENTS 6,937,548 B2 *   8/2005   Hsiao et al. ............. 369/47.53
7,206,268 B2 *   4/2007   Gotoh et al. ............. 369/47.14

FOREIGN PATENT DOCUMENTS

| JP | 2001-236739 A | 8/2001 |
|---|---|---|
| JP | 2002-175624 | 6/2002 |
| KR | 2001-0082641 A | 8/2001 |
| KR | 2003-0008537 A | 1/2003 |

OTHER PUBLICATIONS

Chinese Office Action issued in corresponding Chinese Patent Application No. CN 200410090358.4, dated Feb. 10, 2006.
Chinese Office Action issued in corresponding Chinese Patent Application No. CN 200410090358.4, dated Jul. 28, 2006.

* cited by examiner

*Primary Examiner*—Wayne Young
*Assistant Examiner*—Adam R. Giesy
(74) *Attorney, Agent, or Firm*—McDermott Will & Emery LLP

(57) ABSTRACT

An object of the present invention is to provide an optical recording/reproducing apparatus capable of improving medium usability through a laser power adjusting process while keeping compatibility with a read only type medium. The optical recording/reproducing apparatus adjusts laser power using a PCA till the PCA is used up. After the PCA is used up, an additional area is reserved at the outermost circumference position, thereafter when the additional area is used up, a new additional area is reserved at an inner circumference side of the used up additional area to adjust laser power. The additional area is reserved at an outer circumference than a lead-out area, and therefore format compatibility with a read only type optical disc can be maintained. The additional area is reserved only when the PCA is used up, thus capacity compatibility with a read only type optical disc can be maintained while laser power is adjusted with only the PCA.

9 Claims, 11 Drawing Sheets

OPTICAL RECORDING/REPRODUCING APPARATUS

BACKGROUND OF THE INVENTION

1. Field of the Invention

The present invention relates to an optical recording/reproducing apparatus, which is particularly suitable for recording/reproducing information on/from a write once type optical disc.

2. Description of the Related Art

Recording media (optical discs) currently in use are classified into three major types as follows: a read only type medium such as a Compact Disc-Read Only Memory (referred to as CD-ROM) or a Digital Versatile Disc-Read Only Memory (referred to as DVD-ROM); a rewritable type medium such as a Compact Disc-ReWritable (referred to as CD-RW) or a Digital Versatile Disc-ReWritable (referred to as DVD-RW); and a write once type medium such as a Compact Disc-Recordable (referred to as CD-R), a Digital Versatile Disc-Recordable (referred to as DVD-R), or a Digital Versatile Disc+Recordable (referred to as DVD+R). Although write once type media such as CD-R, DVD-R, and DVD+R can each be written only one time, those media are cheep in comparison with rewritable type media and also maintain high compatibility with read only type media such as CD-ROM and DVD-ROM.

A write once type medium has a power calibration area (referred to as PCA) for adjusting laser power at an innermost circumference portion of the disc. Normal recording/reproducing operation is performed after laser power is adjusted using the PCA. In many cases, however, a conventional write once type recording medium uses only the PCA as a laser power adjusting area to maintain complete compatibility with a read only type medium. In those cases, there arises a problem in that recording operation is not performed after the PCA is used up, and therefore medium usability reduces. Such a problem is anticipated to be more serious with increasing capacities of write once type media.

For example, Japanese Non-examined Patent Publication No. 2002-175624 discloses a technique in which a laser power adjusting area (outer power calibration area) is provided in advance at an outermost circumference portion of a write once type medium and the laser power is appropriately adjusted using the adjusting area where required. According to this technique, adjustment of laser power using the outer power calibration area other than ordinary PCA can be performed, whereby the medium usability is improved when compared with the above-mentioned cases.

However, since an outer power calibration area is invariably provided in a write once type medium, this adjusting method cannot provide the write once type medium with capacity compatibility with a read only type medium in the case where both the media have the same disc diameter. There also arises a problem in that recording operation is not performed after the outer calibration is used up as with the above-mentioned case, and therefore medium usability reduces.

SUMMARY OF THE INVENTION

It is an object of the present invention to provide an optical recording/reproducing apparatus which allows a write once type medium to maintain compatibility with a read only type medium as much as possible, and to improve medium usability at the same time.

The present invention provides an optical recording/reproducing apparatus which determines whether reservation of an additional laser power adjusting area is required or not, and reserves an additional laser power adjusting area on a medium only when the reservation is required. The apparatus also prevents a user data memory area from being interfered to the utmost and efficiently reserves an additional adjusting area, whereby capacity reservation of the user data area and an improvement of medium usability are achieved at the same time.

According to an aspect of the present invention, there is provided an optical recording/reproducing apparatus for recording/reproducing information on/from a write once type optical recording medium, including:

recording means for recording information by irradiating the recording medium with a laser beam;

reproducing means for reproducing information by irradiating the recording medium with a laser beam;

laser power adjusting means for adjusting intensity of the laser beam based on a state of recording/reproducing predetermined information on/from a predetermined laser power adjusting area;

reserving means for reserving an additional area for adjusting laser power on an area other than the laser power adjusting area; and determining means for determining whether reserving the additional area is necessary, in which the reserving means reserves the additional area at an area capable of maintaining format compatibility with a read only type optical recording medium according to determination that reserving the additional area is necessary by the determining means.

In further aspect of the information recording/reproducing apparatus, the determining means can include a process to determine whether the laser power adjusting area is used up by laser power adjustment, and, when the laser power adjusting area is determined to be used up, to determine that reserving the additional area is necessary.

In addition to this determination, the determining means can further include a process to determine an operation mode set in the optical recording/reproducing apparatus, and, when an operation mode for allowing reservation of an additional area is determined to be set, to determine that reserving the additional area is necessary.

In further aspect of the information recording/reproducing apparatus, the determining means can further determine whether the additional area is reservable based on a space capacity of the recording medium and a capacity to be used for adjusting laser power, and when the additional area is reservable, the determining means can include a process of determining whether reserving an additional area is necessary.

In further aspect of the information recording/reproducing apparatus, the reserving means can reserve the additional area for predetermined capacity gradually on the optical recording medium, or can reserve the additional area for capacity necessary for adjusting laser power gradually. The reserving means can reserve the additional area from a termination side of a recordable area in turn on the optical recording medium.

In further aspect of the information recording/reproducing apparatus, management information for managing the additional area is recorded at an area capable of maintaining format compatibility with a read only type optical recording medium.

BRIEF DESCRIPTION OF THE DRAWINGS

The above and other objects and features of the present invention will become apparent from the following detailed description taken in conjunction with the accompanying drawings, in which.

DESCRIPTION OF PREFERRED EMBODIMENTS

Hereinafter, embodiments of the present invention will be described in detail with reference to the drawings. It is to be expressly understood, however, that the following embodiments are for the purpose of illustration only and are not intended to limit the scope of the present invention.

Figure 1:
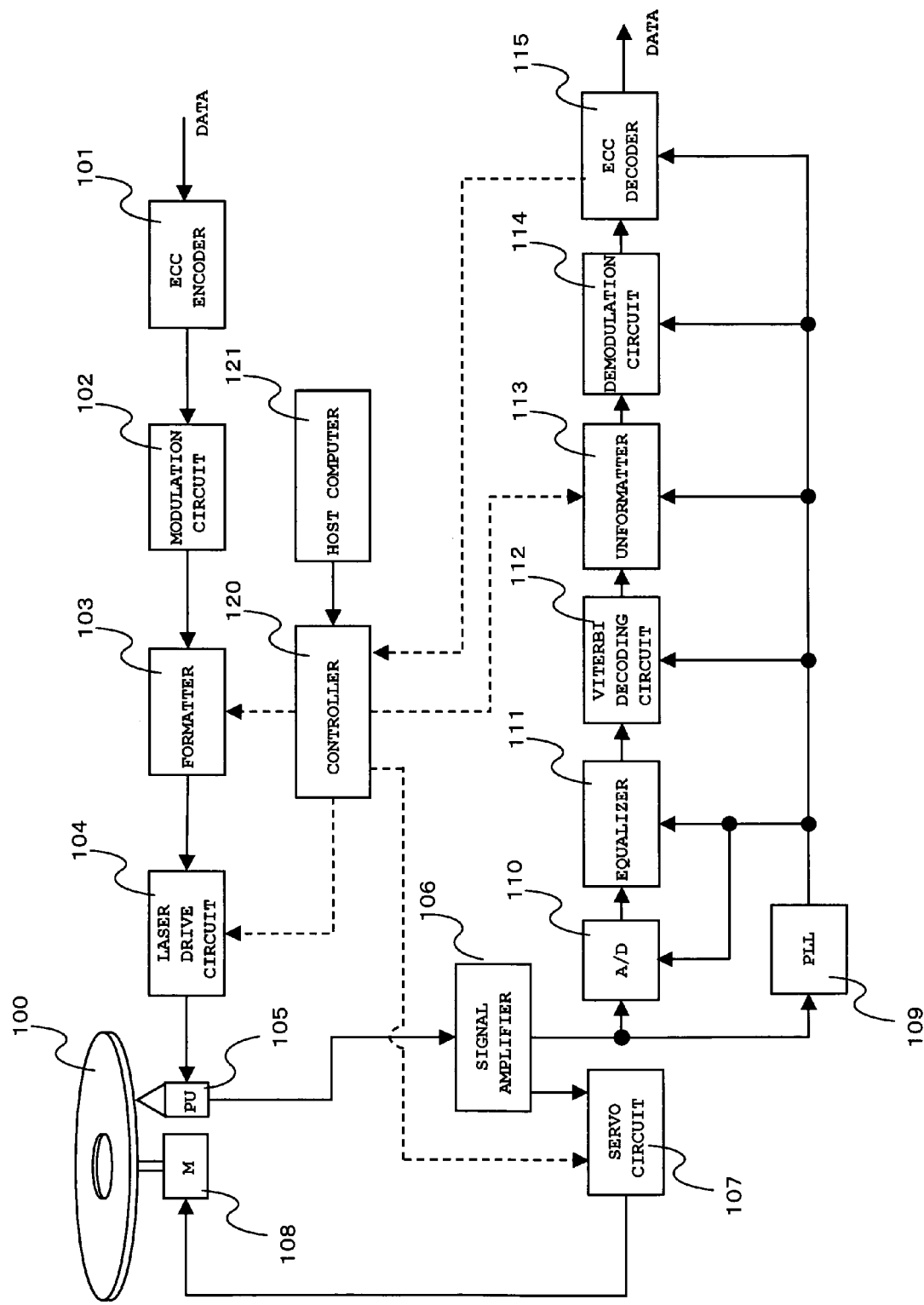
FIG. 1 shows a configuration of an optical recording/reproducing apparatus according to an embodiment of the present invention.

FIG. 1 shows a circuit block diagram of an optical recording/reproducing apparatus which records/reproduces information on/from a write once type disc.

As shown in the figure, the optical recording/reproducing apparatus according to this embodiment includes an error-correcting code (referred to as ECC) encoder 101, a modulation circuit 102, a formatter 103, a laser drive circuit 104, an optical pickup 105, a signal amplifier 106, a servo circuit 107, a spindle motor 108, a phase-locked loop (referred to as PLL) 109, an analog/digital (referred to as A/D) conversion circuit 110, an equalizer 111, a Viterbi decoding circuit 112, an unformatter 113, a demodulation circuit 114, an ECC decoder 115, a controller 120, and a host computer 121. In FIG. 1, reference numeral 100 denotes a write once type optical disk.

The ECC encoder 101 appends an error correction code by implementing a Reed-Solomon code to inputted recording data and outputs it to the modulation circuit 102. The modulation circuit 102 modulates the recording data and the error correction code by applying eight to fourteen modulation (referred to as EFM), eight to fourteen modulation plus (referred to as EFMP), or run length Limited code (referred to as RLL) modulation so that the shortest or longest data length of the recording data is restricted or lower frequencies are suppressed to reduce fluctuation of direct current components (referred to as DC components). The formatter 103 processes the modulated recording data into a form for complying with a physical format of a write once type disc based on a timing signal from the controller 120, and outputs it to the laser drive circuit 104. The laser drive circuit 104 controls the optical pickup 105 to emit a laser beam with optimum recording power for a write once type disc on the basis of the recording signal from the formatter 103.

The signal reproduced by the optical pickup 105 is amplified and calculated by the signal amplifier 106. The servo circuit 107 controls the rotation of the spindle motor 108, and the tracking mechanism and focusing mechanism of the optical pickup 105 on the basis of the signal from the signal amplifier 106. The PLL 109 generates clocks in synchronization with the reproduced data by means of the reproduced radio frequency (referred to as RF) signal from the signal amplifier 106, and outputs them to each of the circuits. The A/D conversion circuit 110 converts the reproduced RF signal from an analog signal to digital data by sampling in synchronization with the clocks from the PLL 109. The equalizer 111 equalizes the digital data to a desired waveform and outputs it to the Viterbi decoding circuit 112. The Viterbi decoding circuit 112 selects the most probable data stream based on the calculated result of a Hamming distance and outputs binary data. The unformatter 113 removes the data processed by the formatter 103 based on the timing signal from the controller 120 and extracts user data and error correction code. The demodulation circuit 114 demodulates the data modulated by the modulation circuit 102 and outputs it to the ECC decoder 115. The ECC decoder 115 detects and corrects errors of the user data by means of the error correction code and outputs the corrected user data to the subsequent circuit.

The controller 120 receives various kinds of commands related to recording and reproducing etc. from the host computer 121, and generates various kinds of timing signals or controlling signals to control each part. The controller 120 adjusts the laser power as will be described below. The host computer 121 includes central processing units (referred to as CPU) and micro processing units (referred to as MPU) and outputs various kinds of commands to the controller 120 in compliance with the input commands etc. from a user.

Now, a laser power adjusting process executed by the controller 120 will be described.

When adjusting the laser power, the controller 120 outputs the predetermined data to the formatter 103 to execute recording operation of the data. The controller 120 at this time outputs, for example, 1 ECC block data eight times, that is, a total of 8 ECC block data, to the formatter 103. While changing the laser power 1 ECC block each, a total of octuplicate data is recorded in the disc 100. An allocation method of an area to be used in the recording will be described in detail later on.

Next, the controller 120 executes reproducing operation of the recorded data. The reproduced data is outputted from the signal amplifier 106 to the ECC decoder 115 via the demodulation circuit 114. The ECC decoder 115 performs sequential processing on the reproduced data by 1 ECC block, and an error rate at this time is outputted to the controller 120. The controller 120 corresponds the error rate of the ECC decoder 115 with the octuplicate laser powers set in the recording, and detects the relationship between the laser power and the error rate.

Figure 2:
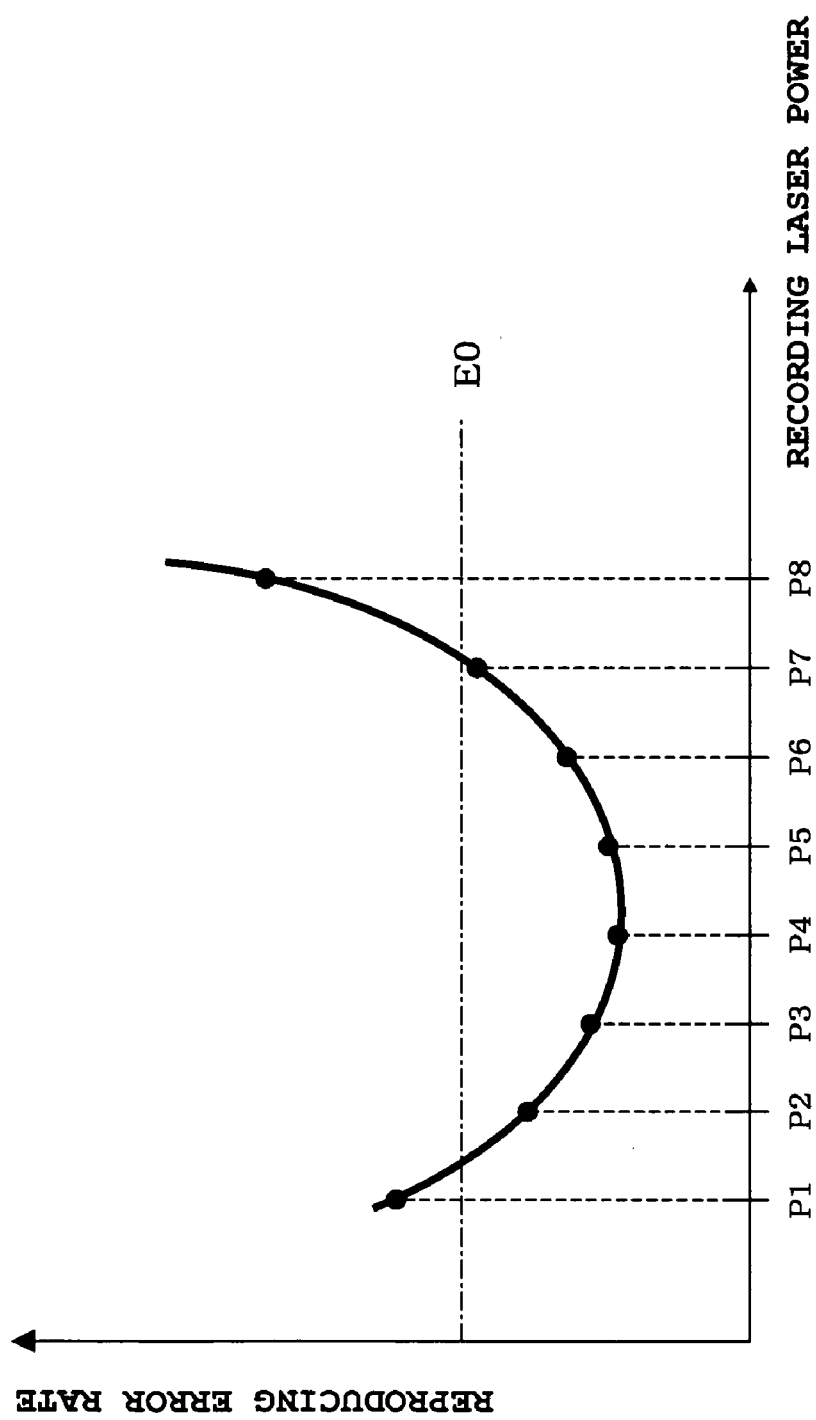
FIG. 2 is a diagram for explaining a laser power adjusting process according to the embodiment.

FIG. 2 shows one example of the detected result at this time.

From the relationship between the detected laser power and the error rate, the controller 120 sets recording power whose error rate is lower than a threshold E0 and is the lowest for example, as the optimum laser power. The subsequent recording operation is executed using the set laser power.

Figure 3A:
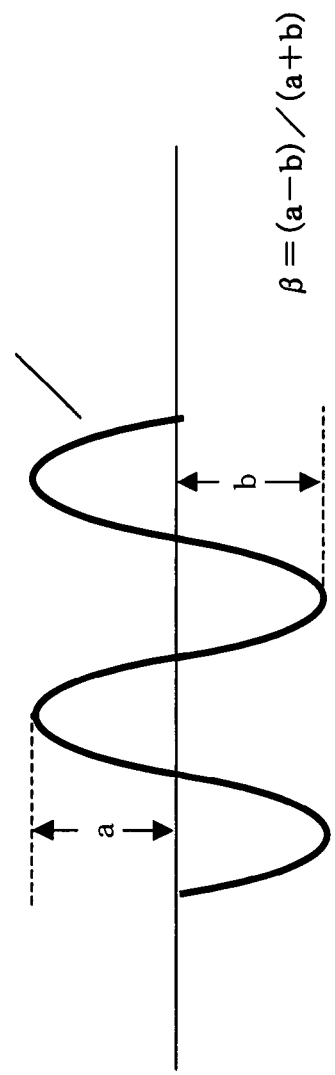
FIG. 3A and FIG. 3B are diagrams for explaining the laser power adjusting process according to the embodiment.
Figure 3B:
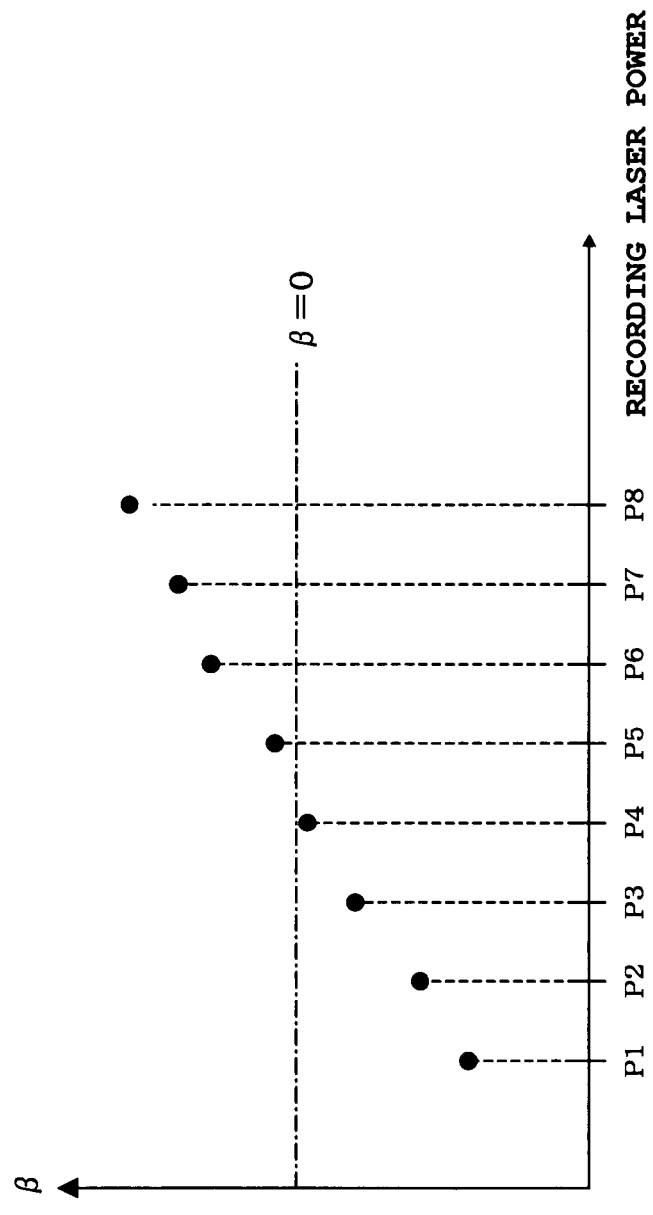

Methods for setting the optimum laser power are not limited to the above method, so various modifications may be available. For example, as shown in FIG. 3A and FIG. 3B, the optimum laser power may be set by monitoring are produced RF signal. In this setting method, a parameter $\beta$ is found from amplitude values a, b of the reproduced RF signal (refer to FIG. 3A) and then the optimum laser power is determined from parameters $\beta$ (refer to FIG. 3B) corresponding with the above-mentioned octuplicate laser powers. In this case, for instance, a parameter $\beta$ being the nearest to zero can be used for the optimum laser power. This power setting method has been known as the $\beta$ method.

Figure 4:
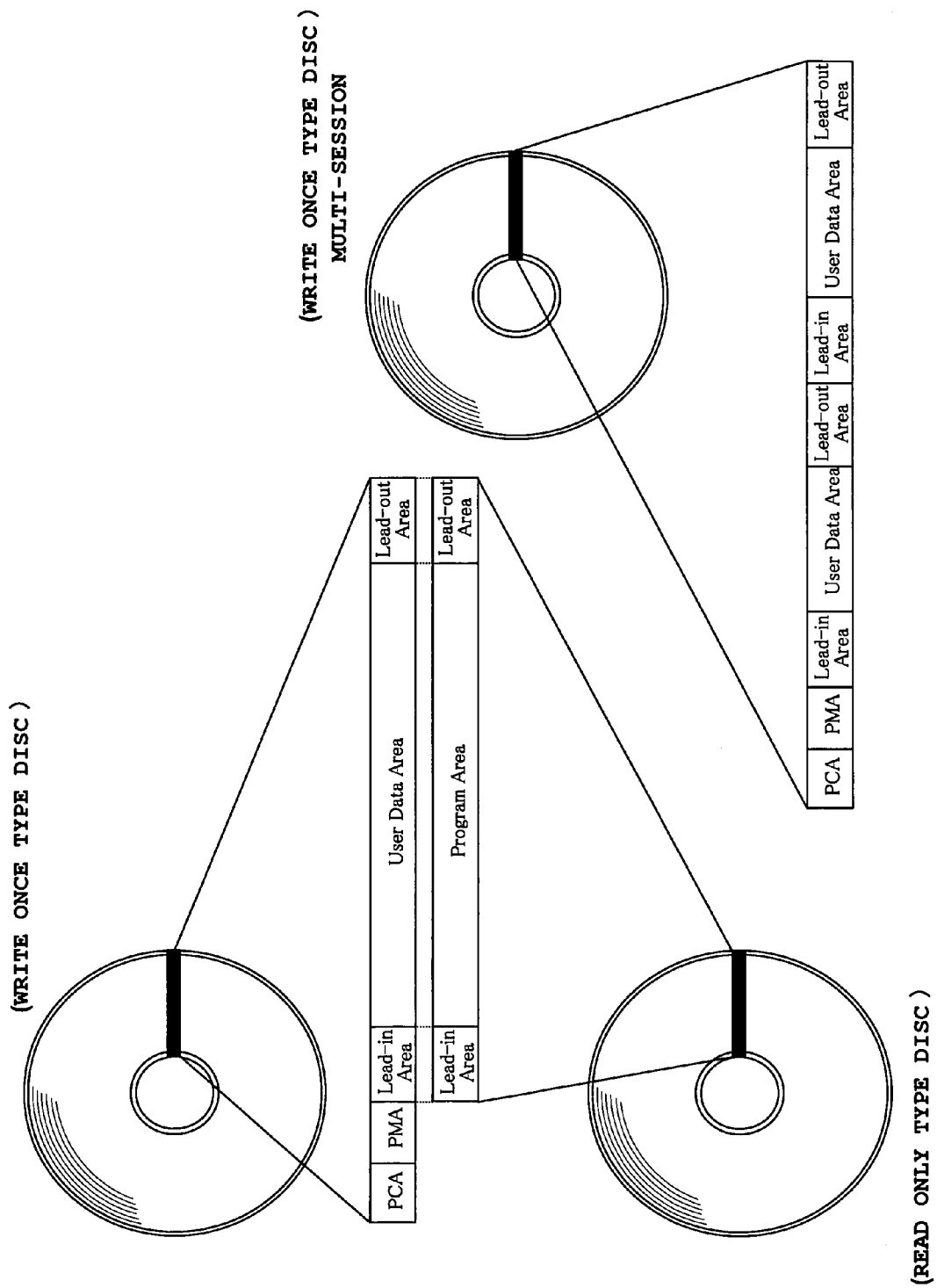
FIG. 4 shows a configuration of a write once type optical disc according to the embodiment.

FIG. 4 shows disc allocation for a write once type disc and a read only type disc. The same figure also shows a disc allocation realizing a plurality of disc configurations in a single disc. This disc allocation is called multiple session or multiple borders in a write once type disc, which is referred to as "multi-session".

As shown in the figure, the read only type disc includes a lead-in area indicating the beginning of program data, a program area storing the program data, and a lead-out area indicating the termination of the program area.

On the other hand, the write once type disc has a configuration completely compatible with the read only type disc physically and logically, and includes reservable recording areas having a lead-in area indicating the beginning of a user data area, the user data area as a recording area of user data, and a lead-out area indicating the termination of the user data area. In addition, the write once type disc includes a power calibration area (PCA) used for determining recording/reproducing laser power, and a program memory area (referred to as PMA) recordable for information peculiar to the write once type disc such as a recording condition or an additional recording pointer. The PCA and PMA are provided at positions prior to the lead-in area of the read only type disc.

Further, in multi-session of a write once type disc, reservation of a plurality of sets having lead-in areas, user data areas, and lead-out areas provide a configuration which seems as if there were a plurality of discs in a single disc.

In this embodiment, when reservation of an additional laser power adjusting area other than the PCA is necessary, and when the reservation of the area concerned is allowed, the additional adjusting area is reserved. The above-mentioned laser power adjusting operation is executed using the PCA or the additional adjusting area. At this time, information on the PCA use state, information related to the presence or absence of reservation of the additional laser power adjusting area, and information on use conditions of the additional laser power adjusting area are recorded and updated in a predetermined area of the disc, for example in a space area of the PMA.

Operation for adjusting laser power using a PCA or an additional adjusting area will be described subsequently.

A. Embodiment 1

Figure 5:
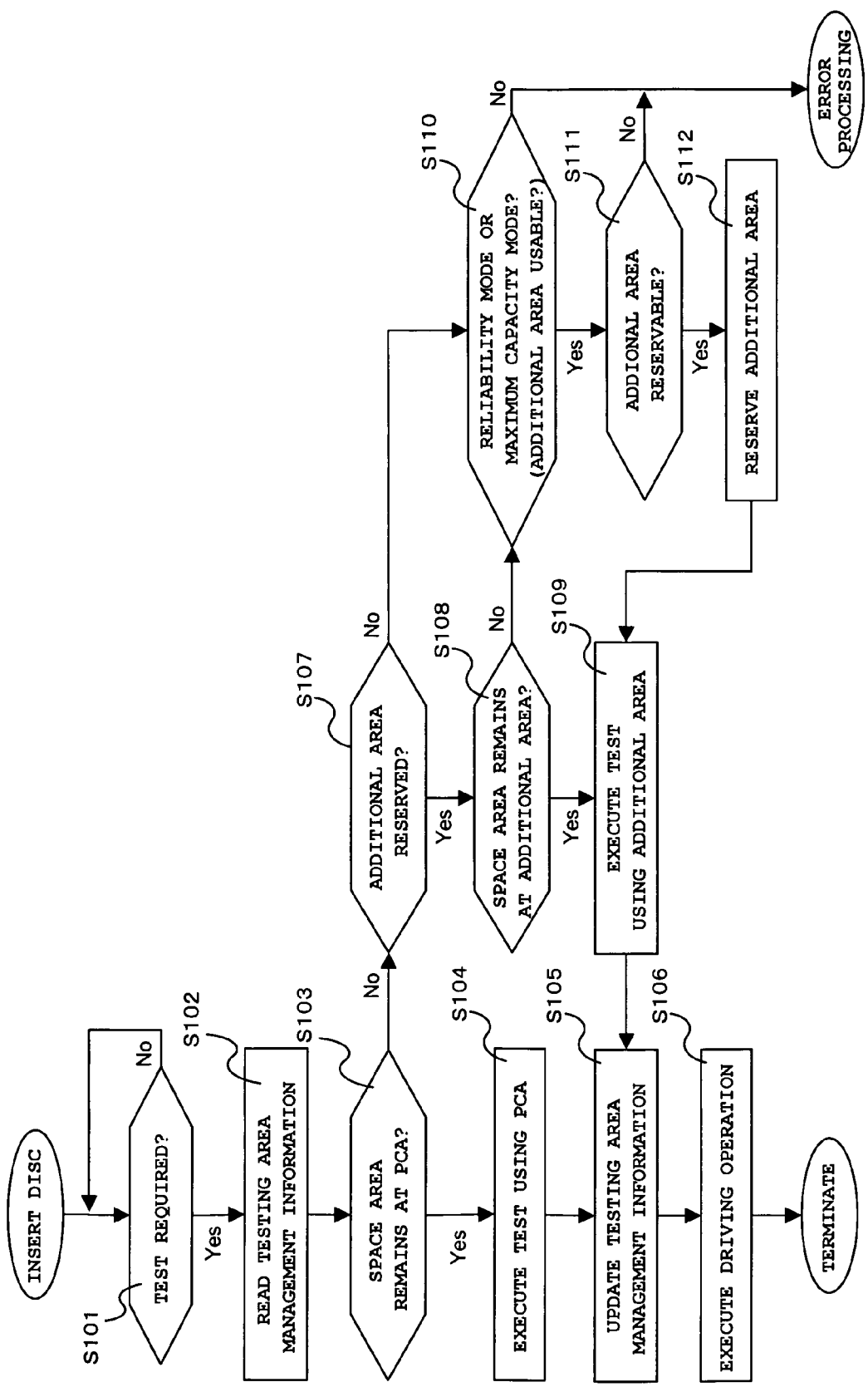
FIG. 5 shows a flow chart of a laser power adjusting process in Embodiment 1.

FIG. 5 shows a flow chart of a laser power adjusting process in Embodiment 1.

In Embodiment 1, information on a PCA use state, information related to the presence or absence of reservation of an additional laser power adjusting area, and information on use conditions of the additional laser power adjusting area (subsequently, these pieces of information are referred to as "testing area management information") are updated and recorded in a space area of a PMA.

In step S101, upon insertion of a write once type disc, a controller 120 determines whether or not a testing requirement (laser power adjusting requirement) is generated from a host computer 121, and waits until the testing requirement is generated in the case of no testing requirement.

Next, in step S102, when the testing requirement is generated from the host computer 121, the controller 120 executes access control to a PMA to read testing area management information at the PMA. Then, in step S103, the controller 120 detects a testing address by referring to the read testing area management information and determines whether a space area remains at the PCA. That is, the controller 120 determines whether the space area capacity is larger than a data capacity (for instance, 8 ECC block data capacity in the above-mentioned case) to be recorded in adjusting laser power.

At this time, in step S104, when a space area remains at the PCA, the controller 120 executes the above-mentioned laser power adjusting operation using the PCA. In step S105, after the completion of adjustment of the laser power, new testing area management information is generated and recorded at the space area of the PMA. After that, in step S106, driving operation is executed at the adjusted laser power.

On the other hand, when the controller 120 determines that no space area remains at the PCA in step S103, the controller 120 refers to the testing area management information read in step S102. Then, in step S107, the controller 120 determines whether an additional laser power adjusting area (subsequently, referred to as "additional area") other than the PCA is reserved. At this time, in step S108, when the additional area is reserved, the controller 120 determines whether a space area remains at the additional area on the basis of the above-mentioned testing area management information. That is, like the above-mentioned step S103, the controller 120 determines whether the space area capacity is larger than a data capacity (for instance, 8 ECC block data capacity in the above-mentioned case) to be recorded in adjusting laser power.

In step S109, when a space area is determined to remain at the additional area, the controller 120 executes the above-mentioned laser power adjusting operation using the additional area. In step S105, new testing area management information is generated and recorded at the space area of the PMA. After that, in step S106, driving operation (recording operation) is executed at the adjusted laser power.

On the other hand, when no space area remains at the additional area, the controller 120 determines whether a mode set in the driving operation is a "reliability mode" or "maximum capacity mode". Here, the reliability mode is a mode which ensures reliability of recording data by executing recording operation after adjusting laser power. The maximum capacity mode is a mode which ensures its maximum recording capacity over reliability of recording data. Those modes are set to recording/reproducing apparatuses according to their setting methods such as: a method in which a user directly selects recording either in a high-reliability mode or not; a method in which an application automatically sets by determining from a medium residual recording capacity and a transfer data capacity; and a method in which application sets on the basis of results of inquiring to users. Information for discriminating such a mode is outputted from the host computer 121 to the controller 120, for example, at the same time of the generation of the testing requirement.

In step S110, when the controller 120 determines that the reliability mode is set, next in step S111, the controller 120 determines whether an additional area is reservable. That is, the controller 120 determines that the additional area is reservable when a residual recording capacity, assuming that recording data is recorded, is larger than the additional area capacity. Further, in this embodiment, the capacity of an additional area to be reserved is set in the predetermined capacity.

Upon determination of the additional area being reservable in step S111, the controller 120 reserves the additional area in step S112 and then executes the processing subsequent to step S109. That is, after laser power is adjusted by using the reserved additional area in step S109, update of testing area management information in step S105 and drive operation in step S106 are executed.

In addition, when determination is made as "No" in step S110 or step S111, the controller 120 executes error processing. In such error processing, the controller 120 executes, for example, drive operation S106 without adjusting laser power, or performs error indication without drive operation.

Figure 6:
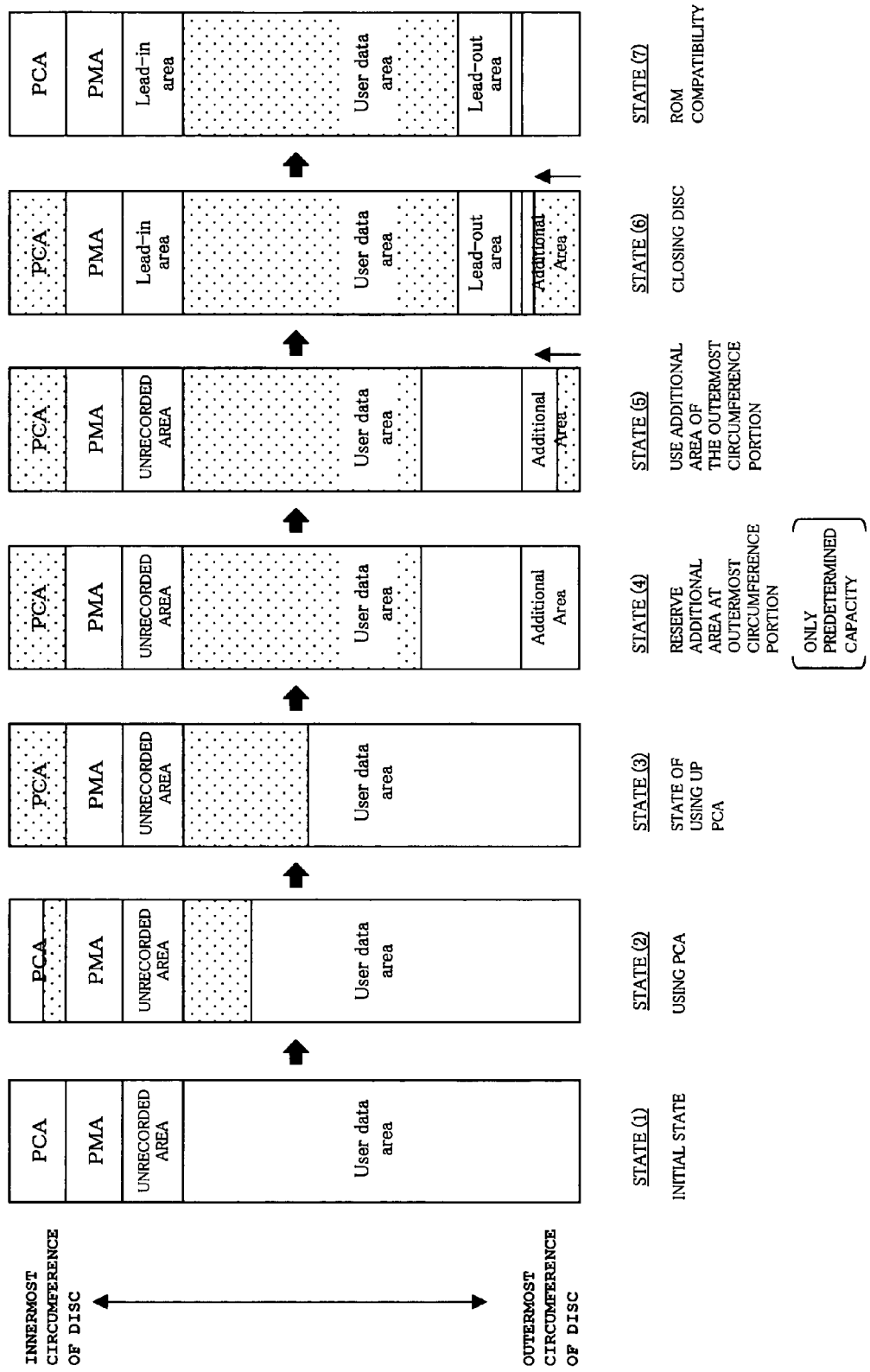
FIG. 6 shows a diagram illustrating one example of data mapping in Embodiment 1.

FIG. 6 shows a diagram illustrating one example of data mapping in the operation of laser power adjusting process in Embodiment 1.

As shown in STATE (1), in an initial state, the write once type disc includes the PCA and the PMA at its inner circumference portion. Then, when recording process is started, the controller 120 reserves first an area for recording lead-in at an unrecorded area. Upon start of the recording process, as shown in STATE (2), user data is recorded while laser power is adjusted with the PCA.

After that, when the PCA is used up as shown in STATE (3), an additional area is reserved at the outermost circumference portion as shown in STATE (4). Here, as shown in the above-mentioned flow chart of FIG. 5, the additional area is reserved only when an operation mode is the high-reliability mode and it is determined that the additional area is reservable. Otherwise, error processing is performed.

Subsequently, with the progress of recording operation, as shown in STATE (5), user data is recorded while laser power is adjusted using the additional area. When closing process is performed after the completion of the recording operation, as shown in STATE (6), lead-in information is recorded at an unrecorded area consecutive to the PMA and lead-out information is recorded consecutive to a recording termination position of the user data. Data mapping at this time is shown as STATE (7), which format becomes the same as that of a read only type optical disc. Accordingly, format compatibility between the disc after the recording and the read only type disc is maintained.

Testing area management information is recorded at a space area of the PMA when the laser power is adjusted with the PCA or additional area in STATES (2) to (5).

The optical recording/reproducing apparatus according to this embodiment reserves the additional area only when the PCA is used up, and therefore capacity compatibility with the read only type optical disc can be maintained while laser power is adjusted with only the PCA. The additional area is reserved at an outer circumference than the lead-out area, and therefore the format compatibility with the read only type optical disc can be maintained.

In addition, according to this embodiment, after an additional area is reserved at the outermost circumference position and when the outermost additional area is used up, a further additional area can be reserved at the inner circumference side of the outermost additional area. That is, so long as an additional area is reservable, the additional area can be reserved from the outer circumference side in turn. Accordingly, recording operation can be achieved up to near the disc capacity limit while laser power is adjusted, thereby permitting the disc to significantly improve its usability.

B. Embodiment 2

In Embodiment 1, a predetermined capacity area has been reserved as an additional area. However, in Embodiment 2, only a capacity necessary for adjusting laser power, for example, merely 8 ECC block in the above-mentioned case, is reserved from the outermost circumference side in turn.

Figure 7:
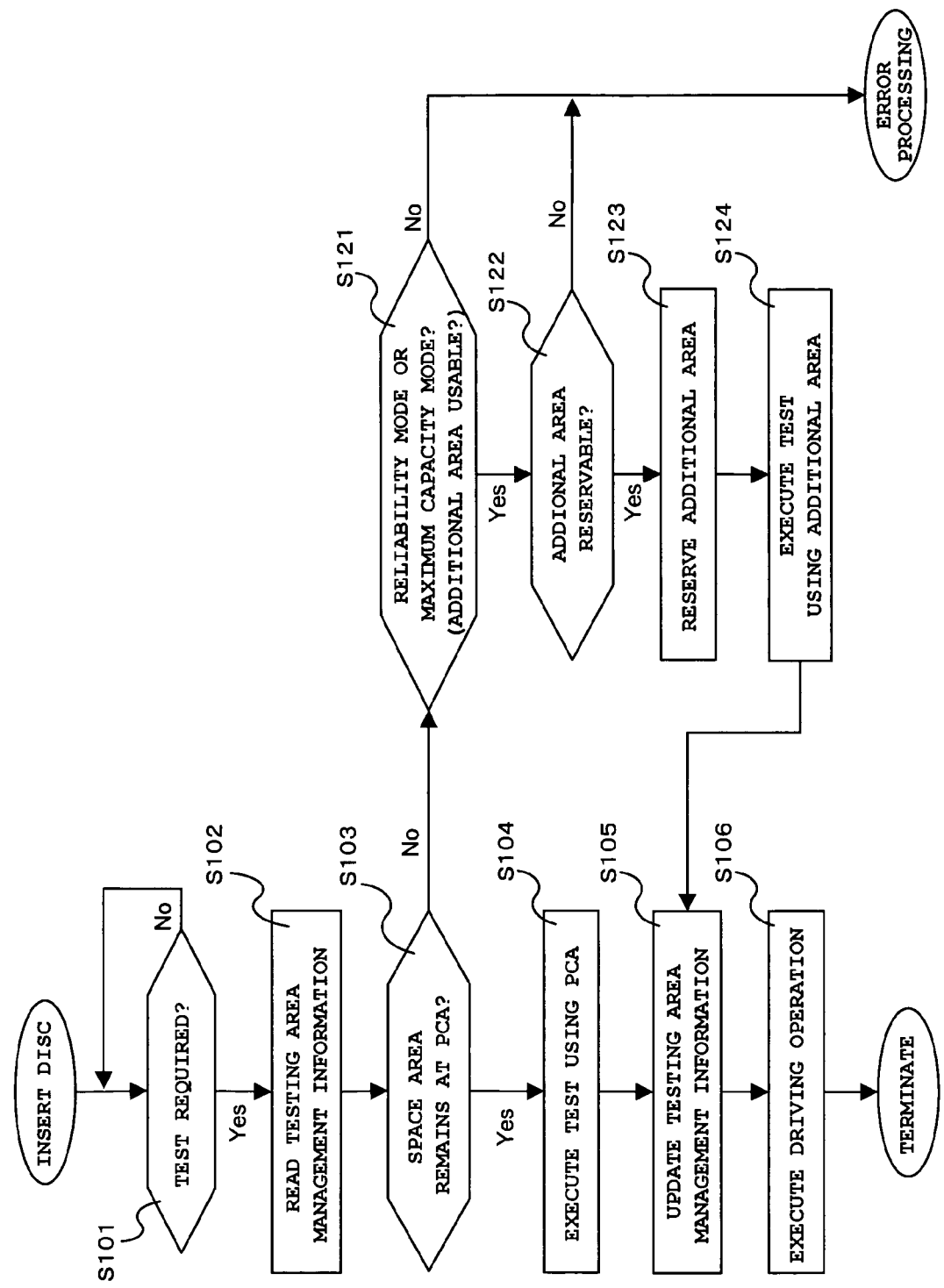
FIG. 7 shows a flow chart of a laser power adjusting process in Embodiment 2.

FIG. 7 shows a flow chart of a laser power adjusting process in Embodiment 2.

In Embodiment 2, like Embodiment 1, testing area management information is updated and recorded in a space area of a PMA. A recording position of the testing area management information is not limited to the space area of the PMA; lead-in and lead-out space areas and a further outer circumference side of the lead-out area may also be recording positions of the test area management information.

In the flow chart of FIG. 7, processing with a space area at the PCA (steps S101 to S106) is the same as that in Embodiment 1.

When no space area remains at the PCA in step S103, the controller 120 determines whether a mode set in the drive operation is a reliability mode or maximum capacity mode in step S121. Here, when the controller 120 determines that the reliability mode is set, next in step S122, the controller 120 determines whether an additional area is reservable. That is, the controller 120 determines that the additional area is reservable when a residual recording capacity, assuming that recording data is recorded, is larger than the additional area capacity. In this embodiment, the capacity of an additional area to be reserved is one necessary for adjusting laser power, 8 ECC block in the above-mentioned case for example, is set.

Upon determination of the additional area being reservable in step S122, the controller 120 reserves the additional area in step S123 and then adjusts laser power using the reserved additional area in step S124. After updating of testing area management information in step S105, drive operation in step S106 is executed.

In addition, when determination is made as "No" in step S121 or step S122, the controller 120 executes error processing. In such error processing, the controller 120 executes, for example, drive operation S106 without adjusting laser power, or performs error indication without drive operation.

Figure 8:
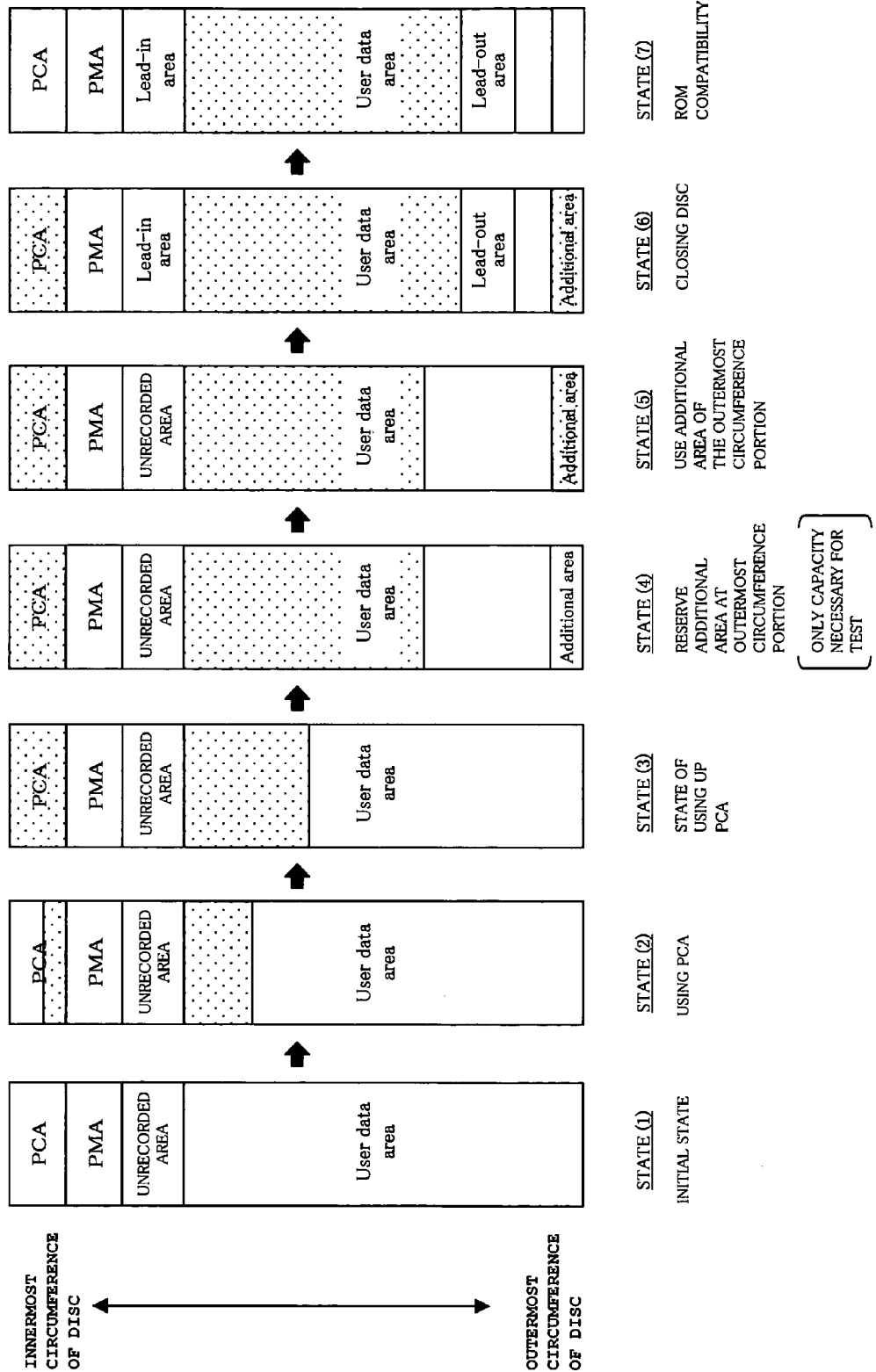
FIG. 8 shows a diagram illustrating one example of data mapping in Embodiment 2.

FIG. 8 shows a diagram illustrating one example of data mapping in the operation of laser power adjusting process in Embodiment 2.

As shown in STATE (1) of the figure, in an initial state, the write once type disc includes the PCA and the PMA at its inner circumference portion. Then, when recording process is started, the controller 120 reserves first an area for recording lead-in at an unrecorded area. Upon start of the recording process, as shown in STATE (2), user data is recorded while laser power is adjusted with the PCA. After that, when the PCA is used up as shown in STATE (3), an additional area is reserved at the outermost circumference portion as shown in STATE (4).

Here, as shown in the above-mentioned flow chart of FIG. 7, the additional area is reserved only when an operation mode is the high-reliability mode and it is determined that the additional area is reservable. Otherwise, error processing is performed.

Subsequently, as shown in STATE (5), laser power is adjusted using the additional area, and then user data is recorded with the adjusted laser power. The reserved additional area is used up by adjusting laser power. When closing process is performed after the completion of the recording operation, as shown in STATE (6), lead-in information is recorded at an unrecorded area consecutive to the PMA and lead-out information is recorded consecutive to a recording termination position of the user data. Data mapping at this time is shown as STATE (7), which format becomes the same as that of a read only type optical disc. Accordingly, format compatibility between the disc after the recording and the read only type disc is maintained.

Testing area management information is recorded at a space area of the PMA when the laser power is adjusted with the PCA or additional area in STATES (2) to (5).

The optical recording/reproducing apparatus according to this embodiment reserves an additional area further outside of a lead-out area at the outer circumference, and therefore capacity compatibility with the read only type optical disc can be maintained like Embodiment 1. The additional area is reserved only when the PCA is used up, so that capacity compatibility with the read only type optical disc can be maintained while laser power is adjusted with only the PCA.

In addition, according to this embodiment, a capacity necessary for adjusting laser power at one time is reserved in an additional area, which is used up for the adjusting laser power. After that, when additional laser power adjustment is required, a new additional area can be reserved at the inner circumference side of the used additional area. That is, so long as an additional area is reservable, the additional area can be reserved with capacity necessary for adjusting laser power at a time from the outer circumference side in turn. Accordingly, recording operation can be achieved up to near the disc capacity limit while laser power is adjusted, thereby permitting the disc to significantly improve its usability. Further, since the additional area can be reserved with only capacity necessary for adjusting laser power at one time, useless reservation of an additional area can be avoided, whereby a recording area of user data can be effectively utilized.

C. Embodiment 3

In each of Embodiments 1 and 2, an additional area has been reserved after a PCA has been used up. However, in Embodiment 3, an additional area is reserved when a request of reserving the additional area is generated from a host computer 121, and laser power is adjusted by selectively using a PCA and the additional area.

Here, the reserving request from the host computer 121 is generated when a recording area of user data moves from an inner circumference side to an outer circumference side. That is, when recording is performed at the outer circumference side area, adjusting laser power using the additional area at the outermost circumference is more suitable for reflecting disc characteristics than adjusting laser power using the PCA at the innermost circumference. Accordingly, when the recording area moves from the inner circumstance side to the outer circumstance side, recording operation is performed by adjusting laser power using the additional area which is reserved at the outermost circumference portion.

Figure 9:
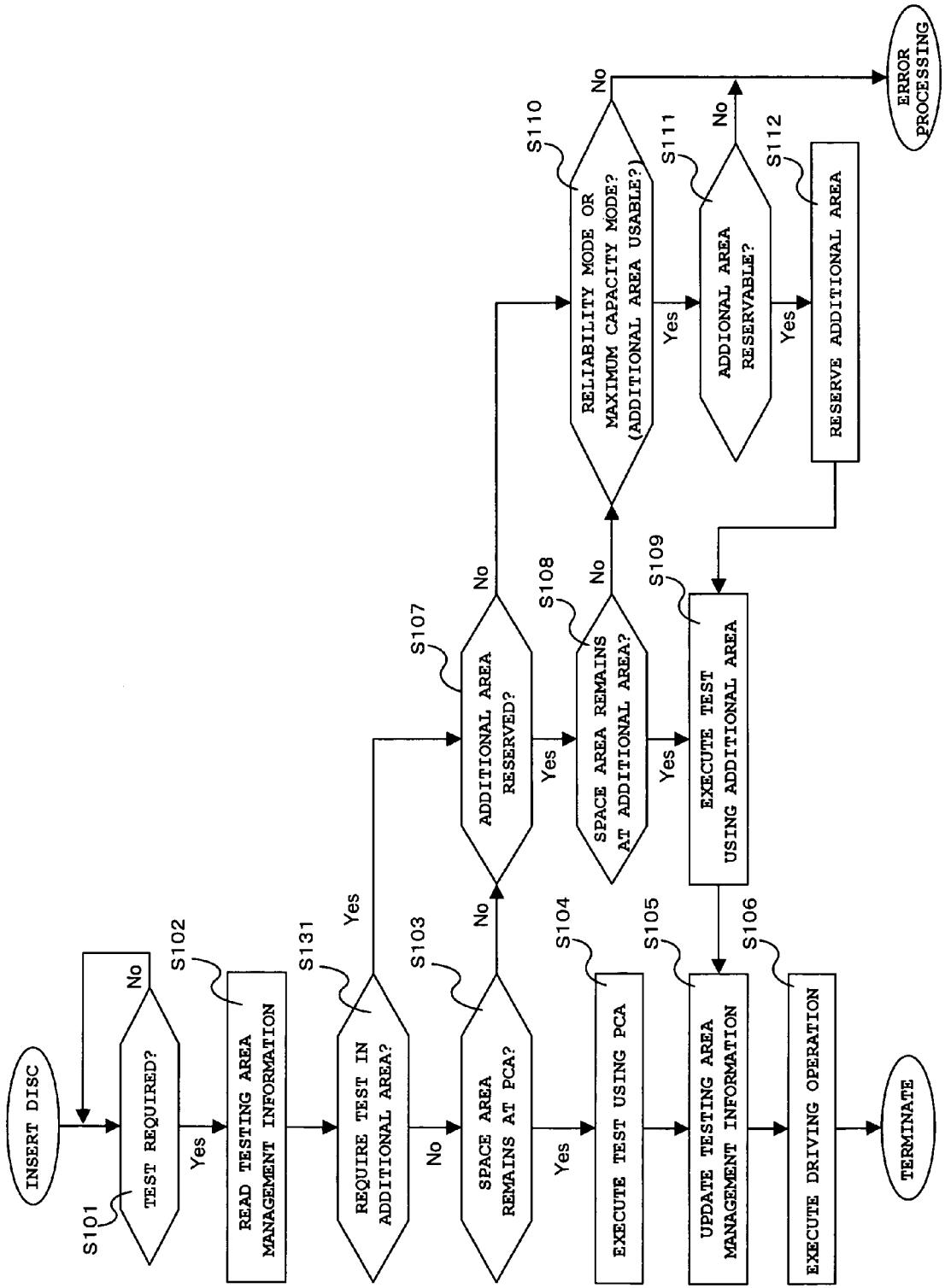
FIG. 9 shows a flow chart of a laser power adjusting process in Embodiment 3.

FIG. 9 shows a flow chart of a laser power adjusting process in Embodiment 3.

In Embodiment 3, like Embodiments 1 and 2, testing area management information is updated and recorded in a space area of a PMA. Further, like Embodiment 1, the capacity of an additional area to be reserved is set in a predetermined capacity.

In the flow chart of FIG. 9, processing in steps S107 to S112 is the same as that in Embodiment 1. In this embodiment, in step S131, whether the host computer 121 generates a request of adjusting laser power in the additional area is determined. Here, when the laser power adjustment with the additional area is required, the processing goes to step S107, and, like Embodiment 1, laser power adjustment with the additional area is executed. While, when laser power adjustment with the additional area is not required, the processing goes to step S103, and, like Embodiment 1, laser power adjustment with the additional area is executed. Further, in step S103, when it is determined that no space area remains at the PCA, the processing goes to step S107, and laser power adjustment with the additional area is executed. That is, although the host computer 121 does not command to use the additional area, in order to improve reliability of recording data, the processing is changed to laser power adjustment with the additional area.

Figure 10:
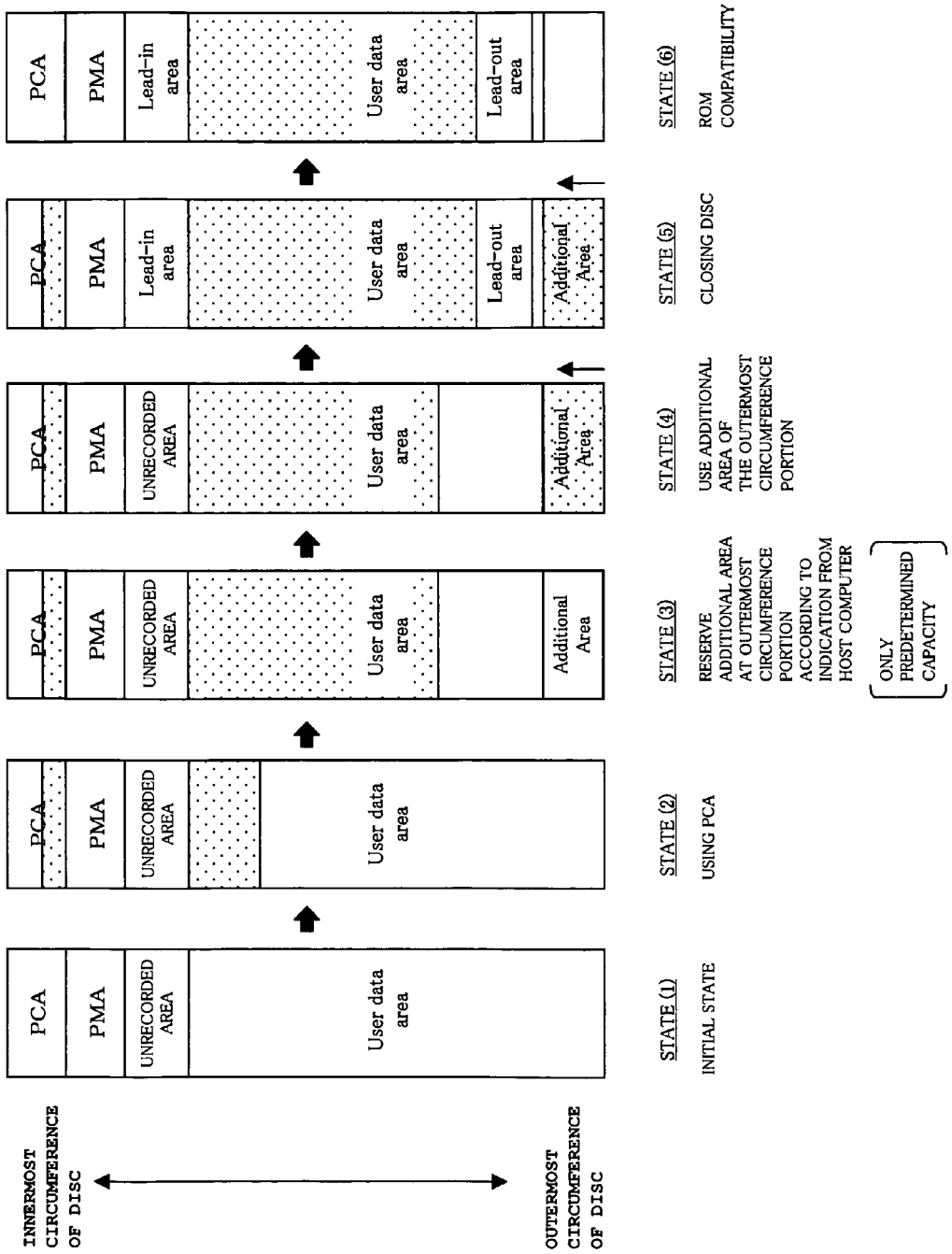
FIG. 10 shows a diagram illustrating one example of data mapping in Embodiment 3.

FIG. 10 shows a diagram illustrating one example of data mapping in the operation of a laser power adjusting process in Embodiment 3.

As shown in STATE (1) of the figure, in an initial state, the write once type disc includes the PCA and the PMA at its inner circumference portion. Then, when recording process is started, the controller 120 reserves first an area for recording lead-in at an unrecorded area. Upon start of the recording process, as shown in STATE (2), user data is recorded while laser power is adjusted with the PCA. After that, when the host computer 121 commands to adjust laser power using an additional area, the additional area is reserved at the outermost circumference portion as shown in STATE (3).

Subsequently, as shown in STATE (4), the laser power is adjusted using the additional area, and the user data are recorded with the adjusted laser power. When closing process is performed after the completion of the recording operation, as shown in STATE (5), lead-in information is recorded at an unrecorded area consecutive to the PMA and lead-out information is recorded consecutive to a recording termination position of the user data. Data mapping at this time is shown as STATE (6), which format becomes the same as that of a read only type optical disc. Accordingly, format compatibility between the disc after the recording and the read only type disc is maintained.

Testing area management information is recorded at a space area of the PMA when the laser power is adjusted with the PCA or additional area in STATES (2) to (5).

The optical recording/reproducing apparatus according to this embodiment reserves an additional area further outside of a lead-out area at the outer circumference, and therefore capacity compatibility with the read only type optical disc can be maintained like Embodiment 1. Further, laser power adjustment is performed while the PCA and the additional area are selectively used. Therefore, for example, laser power adjustment is performed by reserving the additional area when a recording area moves from the inner circumference side to the outer circumference side, thereby permitting the laser power adjustment to better reflect disc characteristics. As a result, reliability of recording data can be improved.

In addition, according to this embodiment, when an additional area is used up after the additional area is reserved at the outermost circumference position, a new additional area can be further reserved at the inner circumference side of the used-up additional area. That is, so long as an additional area is reservable, the additional area can be reserved from the outer circumference side in turn. Accordingly, recording operation can be achieved up to near the disc capacity limit while laser power is adjusted, thereby permitting the disc to significantly improve its usability.

Figure 11:
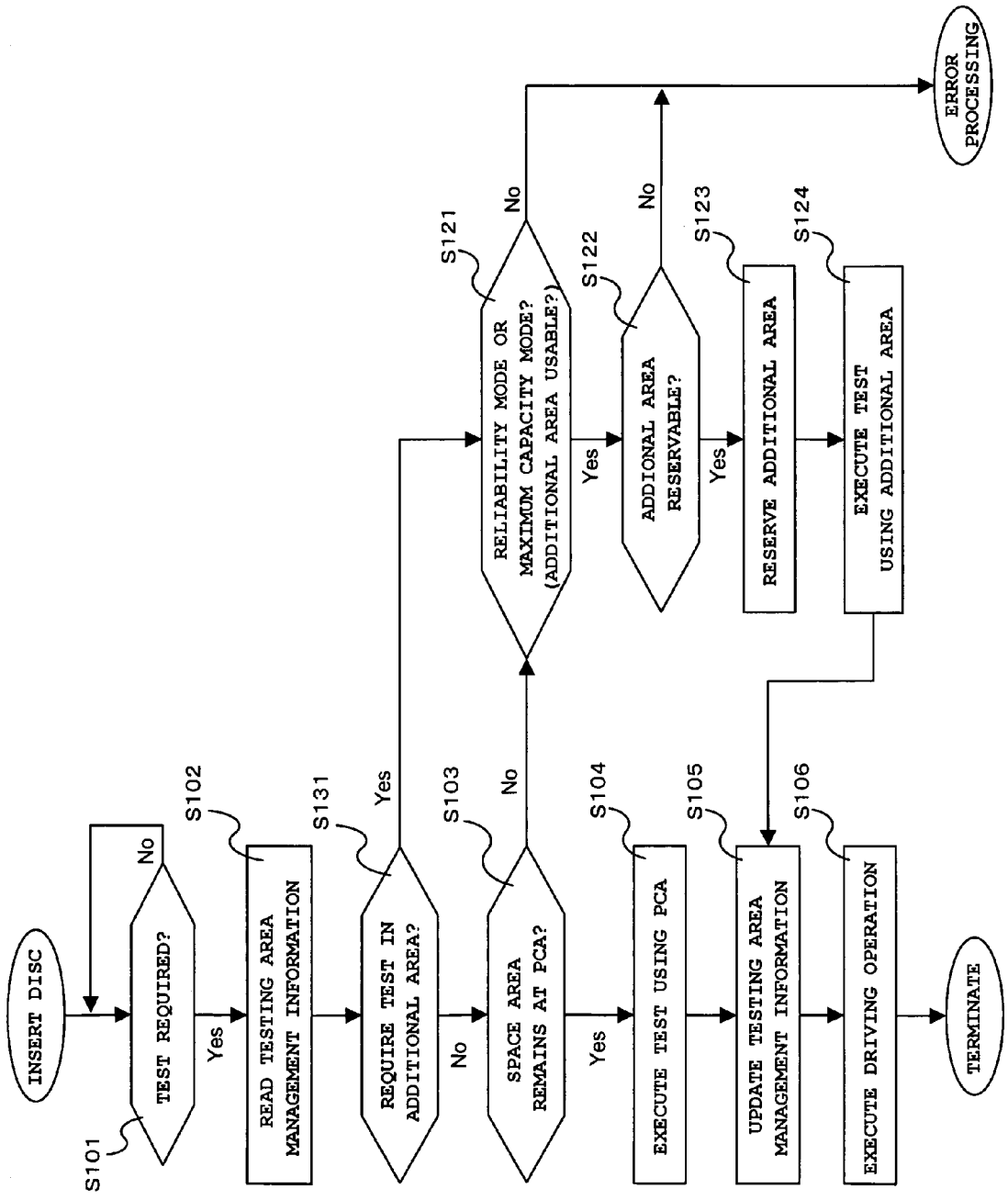
FIG. 11 shows a modified flow chart of the laser power adjusting process in Embodiment 3.

By the way, in this embodiment, a predetermined capacity has been reserved as the additional area. However like Embodiment 2, the additional area can be reserved with only a capacity necessary for adjusting laser power, for example, 8 ECC block in the above-mentioned case from the outermost circumference side in turn. In this case, a flow chart for adjusting laser power is changed as shown in FIG. 11. The flow chart is the same as that shown in FIG. 7 of Embodiment 2 except that step S131 is inserted between steps S102 and S103 shown in FIG. 7.

According to the flow chart, since the additional area can be reserved with only a capacity necessary for adjusting laser power at one time, useless reservation of an additional area can be avoided, whereby a recording area of user data can be effectively utilized.

It is to be clearly understood that the present invention is not limited to the above-mentioned embodiments, but various changes and modifications may be made. The embodiments of the present invention may be applicable to various changes and modifications in the scope of technical idea of the present invention as set forth in the appended claims.

What is claimed is:

1. An optical recording/reproducing apparatus for recording/reproducing information on/from a write once type optical recording medium, comprising:

recording means for recording information by irradiating the recording medium with a laser beam;

reproducing means for reproducing information by irradiating the recording medium with a laser beam;

laser power adjusting means for adjusting intensity of the laser beam based on a state of recording/reproducing predetermined information on/from a predetermined laser power adjusting area;

reserving means for reserving an additional area for adjusting laser power on an area other than the laser power adjusting area; and determining means for determining whether reserving the additional area is necessary, lead-out information recording means for recording lead-out information on a lead-out area, wherein the reserving means reserves the additional area at an area capable of maintaining format compatibility with a read only type optical recording medium according to determination that reserving the additional area is necessary by the determining means, and wherein the lead-out information recording means records the lead-out information so that the additional area reserved by the reserving means is more apart from a recording area of main information than the lead-out area.

2. An information recording/reproducing apparatus according to claim 1, wherein the determining means includes a process to determine whether the laser power adjusting area is used up by laser power adjustment, and, when the laser power adjusting area is determined to be used up, to determine that reserving the additional area is necessary.

3. An information recording/reproducing apparatus according to claim 1, wherein the determining means includes a process to determine an operation mode set in the optical recording/reproducing apparatus, and, when an operation mode for allowing reservation of an additional area is determined to be set, to determine that reserving the additional area is necessary.

4. An information recording/reproducing apparatus according to claim 1, wherein the determining means includes a process to determine whether the additional area is reservable based on a space capacity of the recording medium and a capacity to be used for adjusting laser power, and when the additional area is reservable, to determine that reserving an additional area is necessary.

5. An information recording/reproducing apparatus according to any one of claims 1 to 4, wherein the reserving means reserves the additional area for predetermined capacity gradually.

6. An information recording/reproducing apparatus according to claim 5, wherein the reserving means reserves the additional area from a termination side of a recordable area in turn.

7. An information recording/reproducing apparatus according to any one of claims 1 to 4, wherein the reserving means reserves the additional area for capacity necessary for adjusting laser power gradually.

8. An information recording/reproducing apparatus according to claim 7, wherein the reserving means reserves the additional area from a termination side of a recordable area in turn.

9. An information recording/reproducing apparatus according to any one of claims 1 to 4, wherein management information for managing the additional area is recorded at an area capable of maintaining format compatibility with a read only type optical recording medium.

* * * * *